(12) United States Patent
Ito

(10) Patent No.: US 6,288,874 B1
(45) Date of Patent: Sep. 11, 2001

(54) HEAD SLIDER FOR USE IN A DISK DRIVE

(75) Inventor: Jun Ito, Tokyo (JP)

(73) Assignee: Kabushiki Kaisha Toshiba (JP)

( * ) Notice: Subject to any disclaimer, the term of this patent is extended or adjusted under 35 U.S.C. 154(b) by 0 days.

(21) Appl. No.: 09/340,889

(22) Filed: Jun. 28, 1999

(30) Foreign Application Priority Data

Jun. 30, 1998 (JP) .................................................. 10-199519

(51) Int. Cl.$^7$ ....................................................... G11B 5/60

(52) U.S. Cl. ..................................... 360/235.5; 360/235.6; 360/235.8; 360/236; 360/236.1

(58) Field of Search .............................. 360/235.5, 235.6, 360/235.8, 236, 236.1

(56) References Cited

U.S. PATENT DOCUMENTS 6,021,020 * 2/2000 Itoh et al. ......................... 360/235.6

* cited by examiner

Primary Examiner—Robert S. Tupper
(74) Attorney, Agent, or Firm—Gray Cary Ware & Freidenrich

(57) ABSTRACT

A negative pressure air bearing type head slider is disclosed which is for use in a disk drive and has a head element mounted thereon for reading and writing data from and onto a disk. When loaded, this head slider generates a positive pressure and a negative pressure using inflow and outflow of air due to rotation of the disk, whereby the slider flies above the disk surface with a space therebetween. On the other hand, when the slider is unloaded and retreated from the disk surface, it has a sufficient flying height by virtue of its negative pressure minimizing structure.

8 Claims, 9 Drawing Sheets

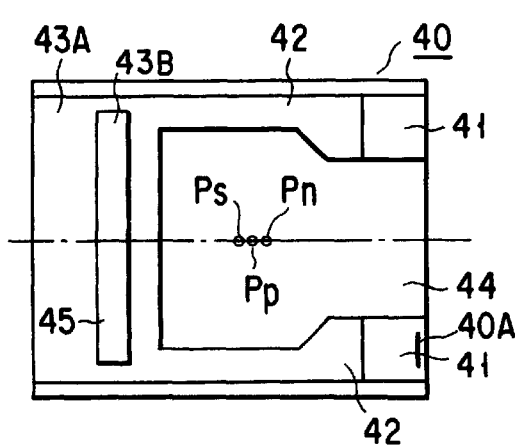
F I G. 3A
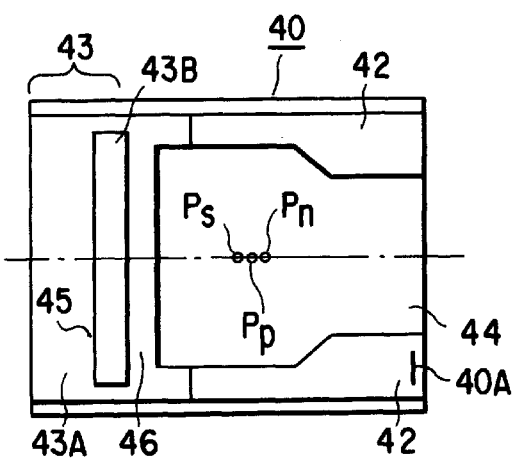
F I G. 4
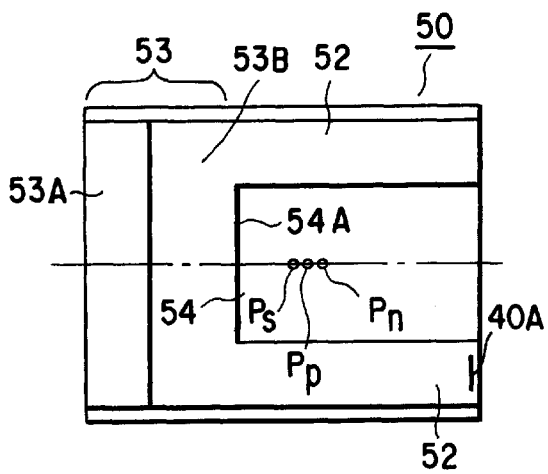
F I G. 5

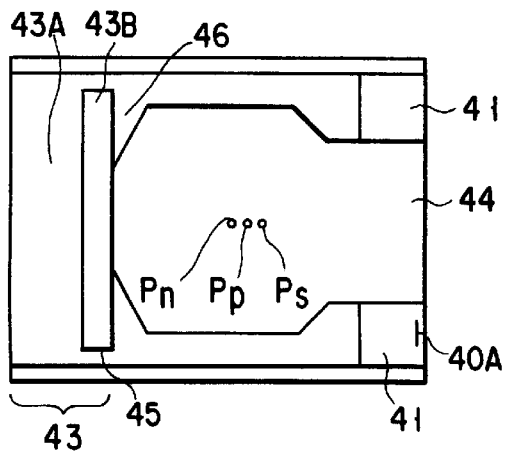
F I G. 6A
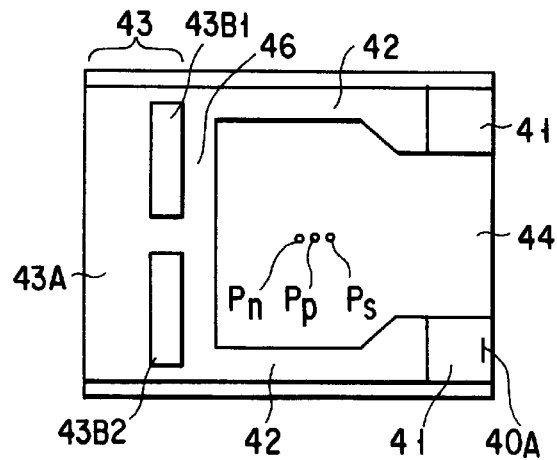
F I G. 6B
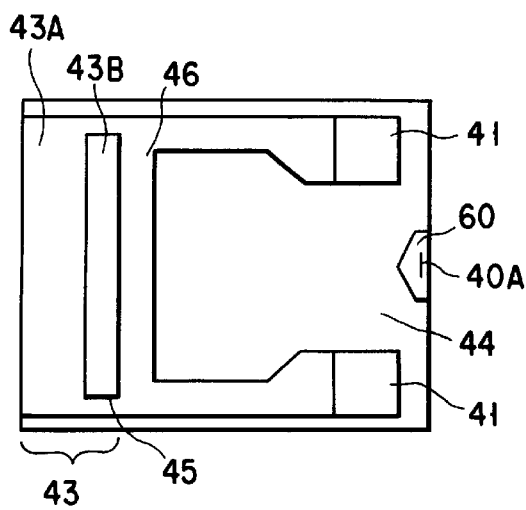
F I G. 6C
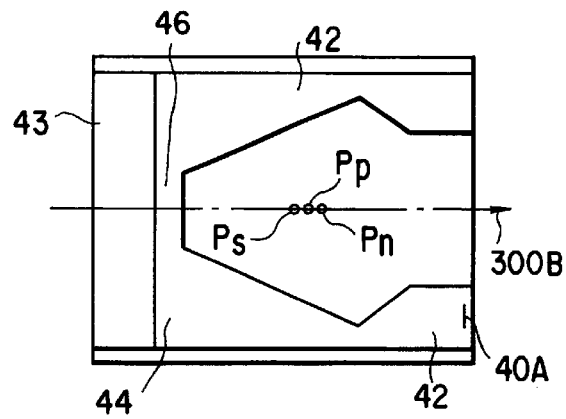
F I G. 6D

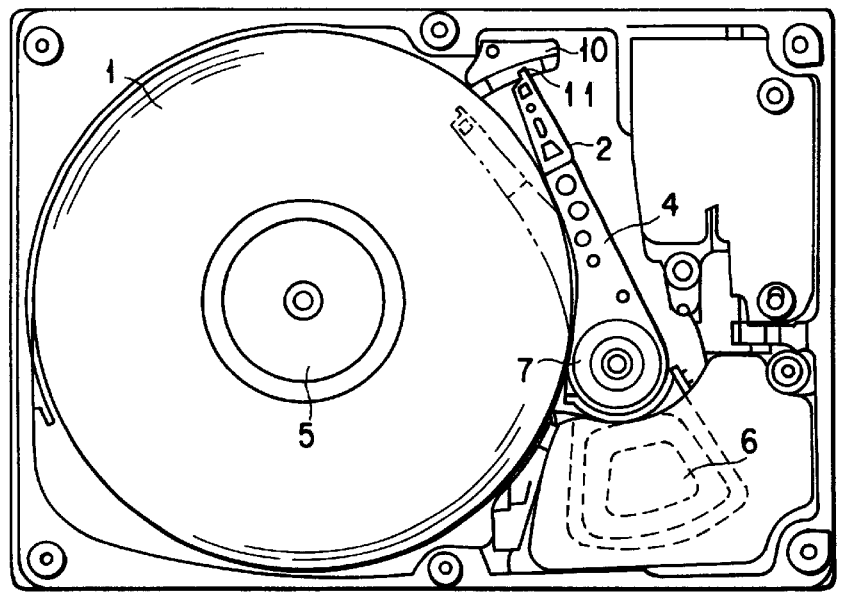
F I G. 15A
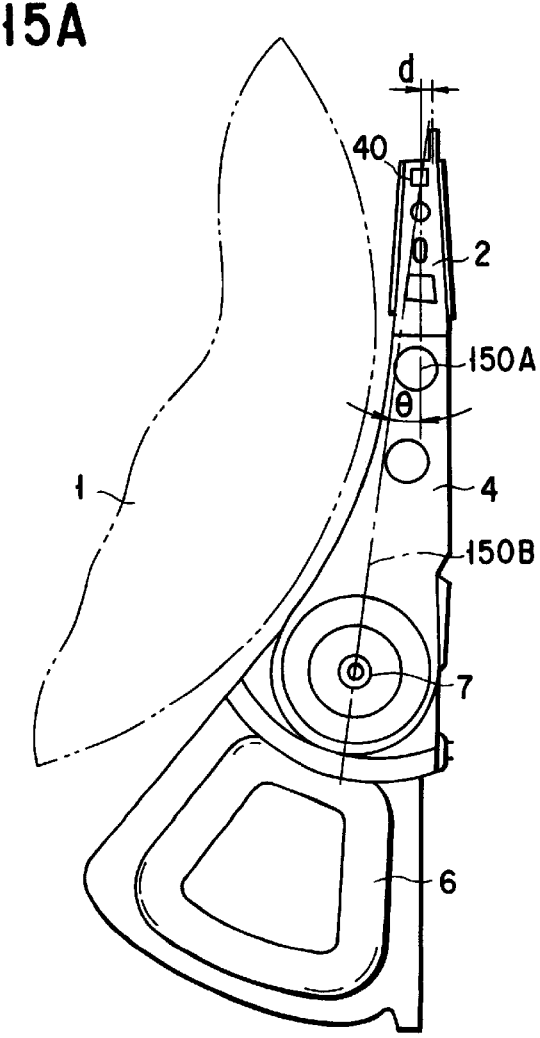
F I G. 15B

HEAD SLIDER FOR USE IN A DISK DRIVE

BACKGROUND OF THE INVENTION

This invention relates to a negative pressure air bearing (NPAB) head slider for use in, in particular, a disk drive incorporating a head disk assembly of a ramp loading type, said head slider has a read/write element for recording and reproducing data onto and from a disk as a recording medium.

In the field of hard disk drives (HDD), the reduction of the flying height of head sliders is demanded in accordance with the development of recording density enhancing techniques. In HDDs, the slider in a flying state moves over the rotating disk when performing an access operation. In a target position on the disk, the data read/write operation is performed by a read/write element (which is also called a "magnetic transducer") mounted on the slider. The aforementioned flying height indicates spacing between the disk surface and the read/write element. The lower the flying height of the slider, the greater the recording/reproducing characteristics of the head.

In a head disk assembly of a contact start stop (CSS) type employed in conventional HDDs, the slider is kept in contact with a CSS area provided on the disk (usually, the radially innermost portion of the disk) when the drive is stopped. To prevent the slider from being adhered to the disk because of static friction and adhesion forces, the disk surface is made rough. This rough surface, however, limits the reduction of the flying height since the slider will collide with bumps of the rough surface if the flying height is too low.

In light of the above, attention is now paid to a ramp loading type head disk assembly, in which the slider and the disk are kept out of contact when the drive is stopped. The ramp loading type is also called a "dynamic head loading and unloading type". Since the ramp loading type permits the slider and the disk to be kept out of contact with each other, the adhesion problem can be avoided. Accordingly, it is not necessary to make the disk surface rough, and hence further reduction of the flying height of the slider can be realized.

Moreover, it is important to stabilize the slider, as well as reduct its flying height. To this end, suppression of fluctuations in the slider's flying height is demanded, which are caused by internal factors such as manufacturing tolerances of component parts of the drive, and by external factors such as pressure fluctuations. A negative pressure air bearing (NPAB) slider is effective to satisfy the demand.

The NPAB slider uses negative air pressure that is applied to the disk (in a direction opposite to positive air pressure that is applied to the slider to raise it from the disk surface). In HDDs, the slider is held by a suspension attached to the actuator arm, and is urged by the suspension toward the disk. Fluctuations of the flying height are suppressed by balancing the sum of the suspension load and the negative air pressure with the positive air pressure applied to the slider, thereby enhancing the rigidity of the air bearing.

In general, an NPAB slider 3 (hereinafter referred to just as a "slider") is held by a suspension 2 via gimbals 2B as shown in FIG. 12A. In this state, a suspension load (Fs) is applied from a pivot 2A provided on the suspension 2 toward the surface of a disk 1. In other words, the slider 3 is urged toward the disk surface. Since the disk 1 is rotated at high speed (in a direction indicated by arrow 100), the slider 3 has an air inlet side (300A) and an air outlet side (300B) with respect to the disk surface, as is shown in FIG. 12B.

A positive pressure (Fp) is applied to the slider 3 as a result of air flowing into a positive pressure generating (PPG) section (30, 32) thereof located close to the disk. The positive pressure (Fp) raises the slider 3 from the disk surface. On the other hand, a negative pressure (Fn) is applied to the slider 3 from a negative pressure generating (NPG) section 31. The negative pressure (Fn) urges the slider 3 toward the disk surface. FIG. 12B shows the suspension load (Fs), the positive pressure (Fp), the negative pressure (Fn), and points (Ps, Pp, Pn) at which the load and forces are exerted, respectively.

The PPG section of the slider 3 comprises a horse shoe-shaped bottom surface 30 (which can be brought into contact with the disk surface), and a relatively shallow step section 32 with respect to the bottom surface 30. The NPG section 31 of the slider 3 is a relatively deep step section with respect to the bottom surface 30. A read/write element 3A is provided at an outlet-side end of the bottom surface 30. At the time of unloading, when the slider 3 is separated from the disk 1, the positive pressure (Fp) is exerted in a narrow space (Fha) defined between the bottom surface 30 and the surface of the disk 1, while the negative pressure (Fn) is exerted in a space (FHb) defined between the deep stepped section 31 and the surface of the disk 1.

At the beginning of unloading, the positive pressure (Fp) applied to the slider 3 relatively quickly reduces, whereas the negative pressure (Fn) does not so abruptly reduce. At this time, in which the negative pressure (Fn) is relatively large, an unloading force (Fu) is generated in a middle stage of unloading as shown in FIG. 13, whereby a stage in which the slider 3 sucks to the disk surface occurs. This stage occurs when a back surface of the slider 3 is separated from the pivot 2A by the relatively large negative pressure (Fn) to thereby deform the gimbals 2B.

To hold the slider 3 by a ramp member 10 so as to completely unload it from the disk 1 after the transitional stage, it is necessary to raise the slider 3 to a sufficiently high level. The ramp load mechanism used for raising the slider 3 high is a factor that impedes the thinner construction of the drive mechanism. Further, where the negative pressure (Fn) and the unloading force (Fu) balance with each other, the rigidity of the air bearing is low, which will make the flying state of the slider 3 unstable. Accordingly, when the slider 3 is unloaded from the disk 1, it is very possible that they will contact each other, which may lead to their breakage.

Referring to FIGS. 10 and 11, the problem of reduction of the slider's flying height at the time of unloading will be described. When in the ramp loading type HDDs, the supply of power has been erroneously interrupted, it is necessary to unload the slider 3 before the rotation of the disk 1 stops. In other words, a high-speed unloading operation is required. FIG. 10 is a view useful in explaining relative movement of the slider 3 and the disk 1 at the time of unloading. The yaw angle 70 of the slider 3 with respect to the disk 1 (which rotates in a direction indicated by arrow 100) gradually varies from the inner edge to the outer edge of the disk 1, when using a rotary head actuator. In the case of a usual drive, the yaw angle 70 of the slider 3 is designed such that it is smaller at the inner edge side and larger at the outer edge side.

FIG. 11 shows the relationship between the yaw angle of the slider 3 (abscissa) and the flying height (ordinate: FH). As shown in FIG. 12B, the usual slider 3 has a horse shoe-shaped bottom 30 including two leg portions substantially extending in the direction of rotation of the disk 1. The positive pressure (Fp) generated by the slider 3 of this structure reduces when the yaw angle increases. Accordingly, the flying height (FH) of the slider 3 shows a tendency to reduce as the yaw angle increases, as is indicated by curve 80 in FIG. 11. Since, in the usual drive, the rotational speed of the disk is constant, the slider's flying height shows a tendency to increase as the circumferential speed increases from the inner edge side of the disk 1 to the outer edge side. On the other hand, since the yaw angle of the slider 3 is larger at the outer edge side of the disk 1, the slider's flying height shows a tendency to reduce at the outer edge side. These tendencies offset each other to thereby realize a relatively uniform flying height pattern of the slider 3 from the inner edge side to the outer edge side of the disk 1.

As is shown in FIG. 10, the relative movement of the slider 3 and the disk 1 at the time of unloading is expressed by the vector sum (indicated by arrow 73) of the circumferential speed of the disk (indicated by arrow 72) and the unloading speed of the slider 3 (indicated by arrow 74), with the result that the yaw angle increases by an angle indicated by arrow 71. The increase of the yaw angle causes a significant reduction (as indicated by reference numeral 82 in FIG. 11) in the slider's flying height. This reduction of flying height will cause the disk 1 and the slider 3 to contact each other, and hence may cause their breakage.

As described above, in HDDs in which a ramp loading (dynamic head loading and unloading) head assembly is combined with an NPAB slider, the flying state of the slider is unstable, and at worst, the slider may contact the disk and adhere to it. An NPAB slider sucks to the disk during unloading. To prevent such suction, it is necessary to increase the height of the ramp member. Increasing the height, however, impedes the thinner construction of the disk drive. Further, another type of an NPAB slider is proposed which has a structure as shown in FIGS. 14A and 14B. In this case, the NPG section 31 greatly protrudes into the air inlet side (300A) so as to enable the generation of as high a negative pressure (Fn) as possible in a limited area. As a result, the point (Pn) of application of the negative pressure (Fn) is situated at the inlet side (300A), while the point (Pp) of application of the positive pressure (Fp) and the point (Ps) of application (i.e. the pivot position) of the suspension load (Fs) are situated at the outlet side (300B). Even when in this structure, the suspension load (Fs) reduces at the time of unloading, the amount of pitching of the slider 3 (indicated by reference letters PT in FIG. 14A) does not increase, and a change in space between the inlet-side (300A) end of the PPG section 32 and the disk surface is small. Accordingly, as mentioned above, the slider 3 will suck to the disk 1 because of the negative pressure (Fn), which means that the flying state of the slider 3 becomes unstable and may contact the disk 1 when it is unloaded.

BRIEF SUMMARY OF THE INVENTION

It is the object of the invention to improve an unstable flying state of an NPAB slider in a disk drive so as to prevent the slider from contacting the disk surface.

To attain the object, there is provided a negative pressure air bearing type head slider for use in a disk storage device of a ramp loading type in which the head slider is kept in a standby state by a ramp member located in the vicinity of the outer edge of a disk, characterized in that while the slider body is held by a suspension of a head moving mechanism, and flies above at least an outer edge side portion of the disk as a result of inflow of air due to the rotation of the disk, a position-of-application of a negative pressure is set closer to an air outlet than a pivot position as a position-of-application of a suspension load.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3A is a view illustrating a modification of the NPAB slider of the invention;

FIG. 4 is a view illustrating another modification of the NPAB slider of the invention;

FIG. 5 is a view illustrating yet another modification of the NPAB slider of the invention;

FIGS. 6A to 6D are views illustrating other modifications of the NPAB slider of the invention;

FIGS. 15A and 15B are views showing a modification of the HDD related to the invention.

DETAILED DESCRIPTION OF THE INVENTION

The embodiment of the invention will be described with reference to the accompanying drawings.

Figure 1A:
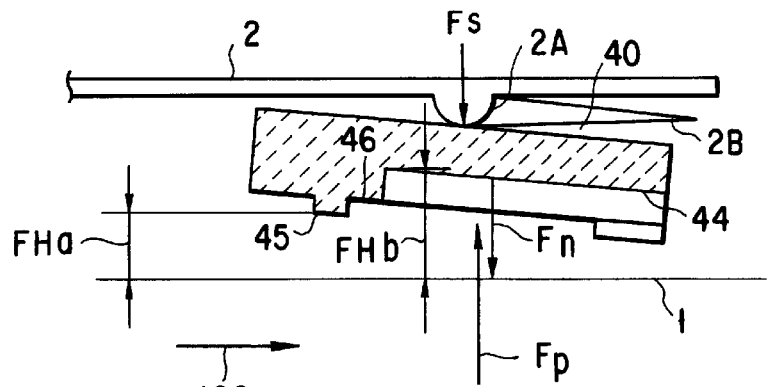
FIGS. 1A and 1B are views illustrating the structure of an NPAB slider according to the embodiment of the invention.
Figure 1B:
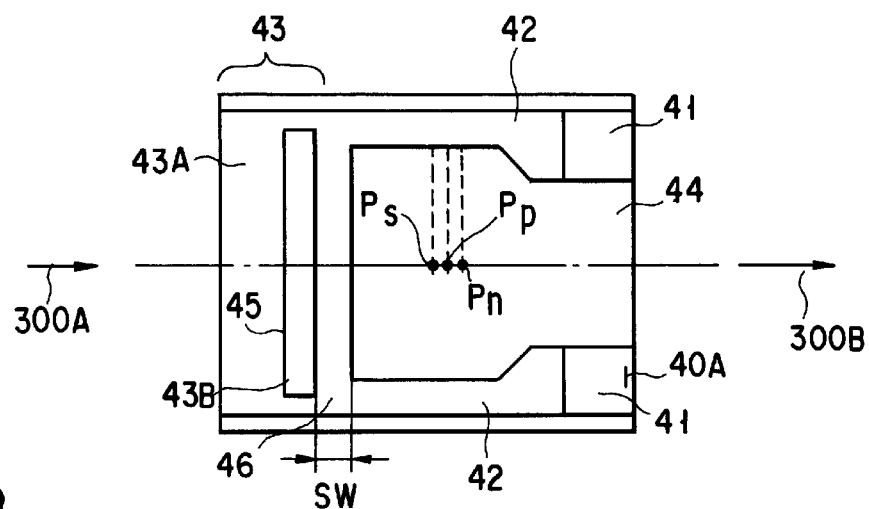
Figure 2:
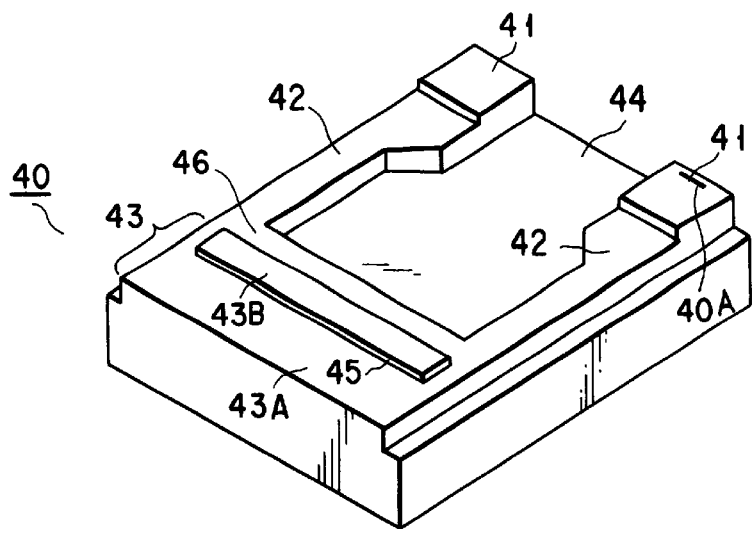
FIG. 2 is a perspective view of the NPAB slider shown in FIGS. 1A and 1B.
Figure 7A:
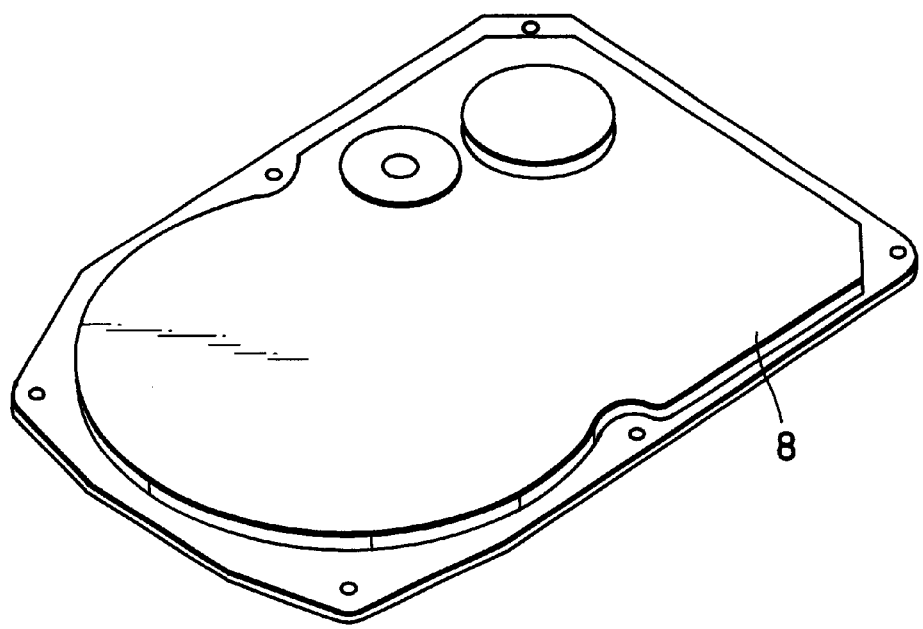
FIGS. 7A, 7B and 8 are views showing the structure of an HDD related to the invention.
Figure 7B:
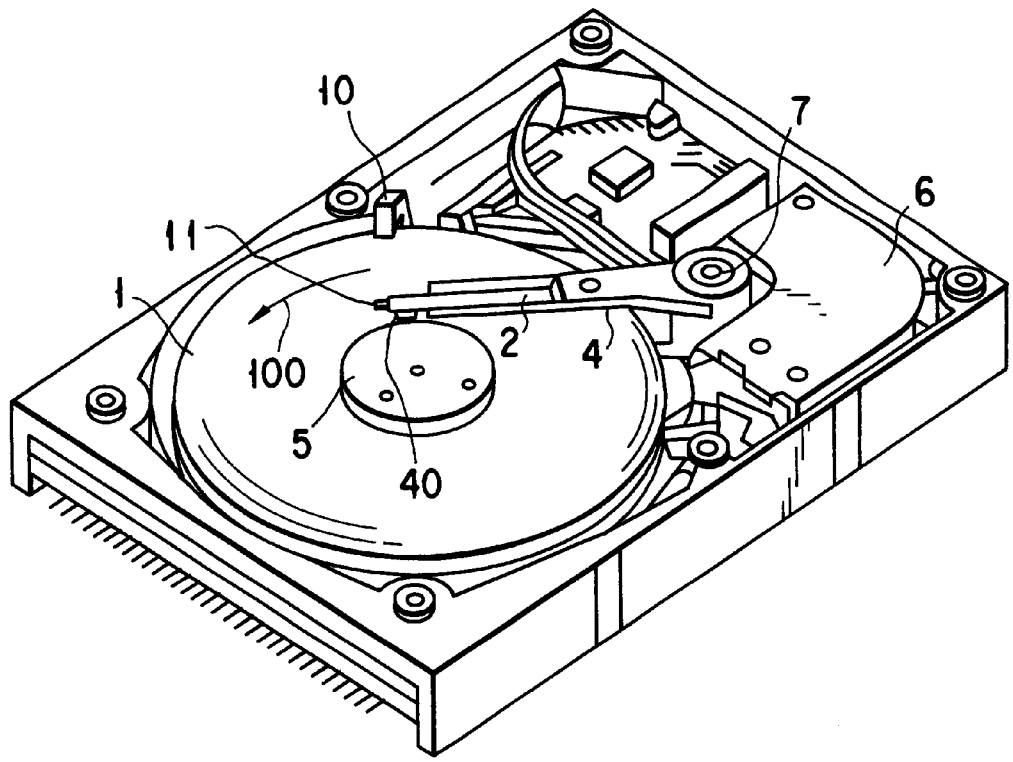
Figure 8:
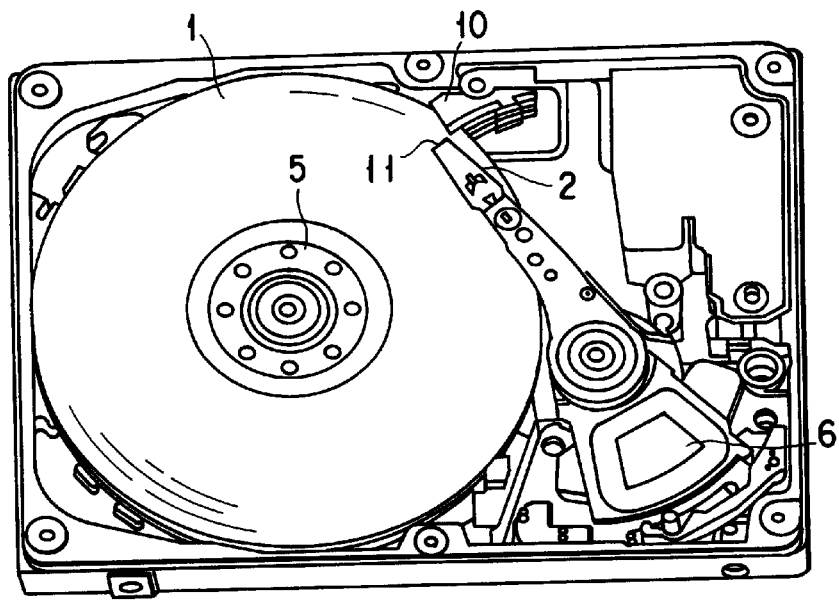

FIGS. 1A, 1B and 2 show the structure of an NPAB slider according to the embodiment of the invention. FIGS. 7A, 7B and 8 show the structure of an HDD related to the embodiment.

(Structure of HDD)

An NPAB slider 40 according to the invention is incorporated in an HDD that has a ramp loading (or dynamic head loading and unloading) type head disk assembly. As is shown in FIG. 7B, an HDD of this type has a ramp member 10 located in the vicinity of the outer edge of a disk 1 and used to unload the slider 40. At the time of unloading, a head actuator 4 moves toward the outer edge of the disk 1, whereby a lift tab 11 attached to a suspension 2 runs onto the ramp member 10. As a result, the slider 40 is put into a standby state in which it is away from the surface of the disk 1. As is shown in FIG. 8, the ramp member 10 is constructed such that its plate member having a slant surface holds an outer edge portion of the disk 1.

When, on the other hand, loading the slider 40, the disk 1 is rotated at high speed by a spindle motor 5. Then, the head actuator 4 is rotated about an axis-of-rotation 7 by a voice coil motor 6 and radially moved toward the inner edge of the disk 1. In accordance with this movement, the slider 40 separates from the ramp member 10 and moves in a flying state over the disk surface, as is shown in FIG. 7B. Further, as is shown in FIG. 7A, the drive mechanism is covered with a cover member 8.

(Structure of Slider)

Figure 12A:
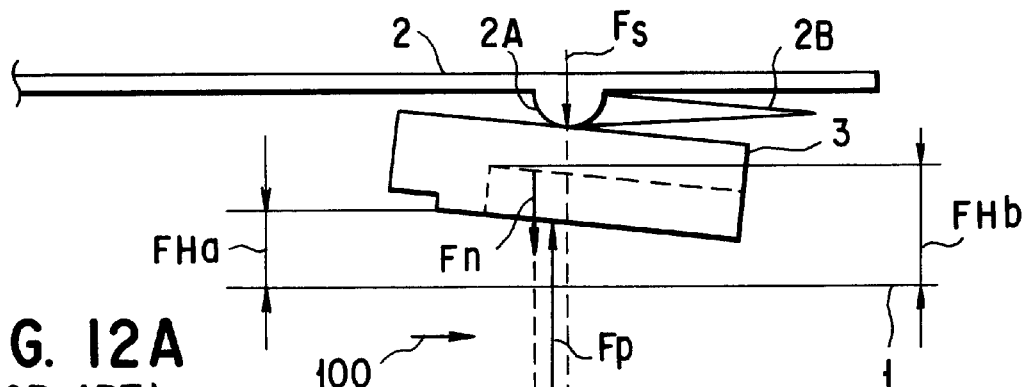
FIGS. 12A and 12B are views showing the structure of a conventional NPAB slider.
Figure 12B:
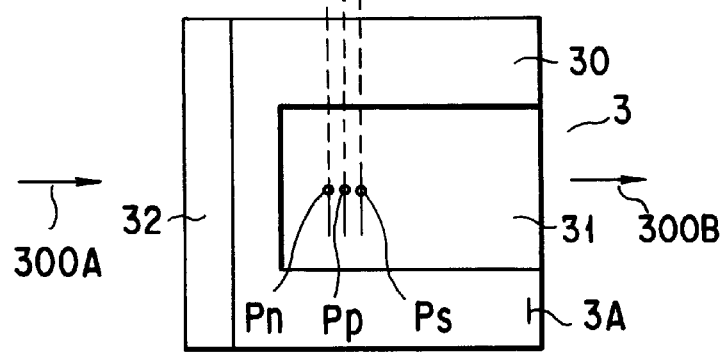
Figure 13:
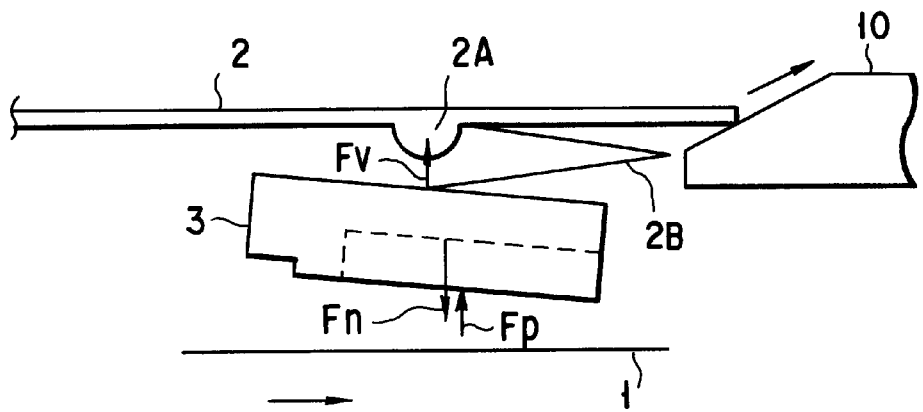
FIG. 13 is a view showing the structure of a conventional NPAB slider.

As is shown in FIGS. 1A, 1B and 2, the slider 40 has PPG sections 43, 41, an NPG section 44 and a relatively shallow step section 46 located therebetween. The step section 46 is defined by a projection 45 provided in the PPAB section 43. The slider 40 is attached to the suspension 2 of the head actuator 4 via gimbals (not shown) as in the case of the aforementioned conventional slider 3. A suspension load (Fs) acting from the pivot 2A of the suspension 2 toward the disk 1 is applied to the slider 40 (see FIG. 12A).

As is shown in FIGS. 1B and 2, the NPG section 44 has a deep portion interposed between projecting side portions 42, and an outlet-side (300B) port. The opposite side portions 42 have respective shallow steps and are provided for preventing the inflow of air from both sides to thereby increase the rate of generation of a negative pressure. Further, a land surface 41 (outlet-side bottom) is provided at an outlet-side end of each side portion 42. A read/write element 40A is provided on one of the contact surfaces 41 (see FIG. 1B).

The PPG section 43 of inlet-side comprises a shallow inlet-side (300A) step 43A and a land surface (inlet-side bottom) 43B incorporated in the projection 45. On the other hand, the PPG section includes the side portions 42 and the outlet-side bottoms 41. The positive pressure applied to the slider is the sum of positive pressures generated from the inlet-side and outlet-side PPG sections. As aforementioned, the step section 46 is provided between the PPG section 43 and the NPG section 44. The step section 46 has a predetermined step width (SW). The position-of-application (Pn) of a negative pressure (Fn) is set at the outlet side (300B) with respect to the pivot position (Ps) by adjusting the step width (SW).

Figure 9:
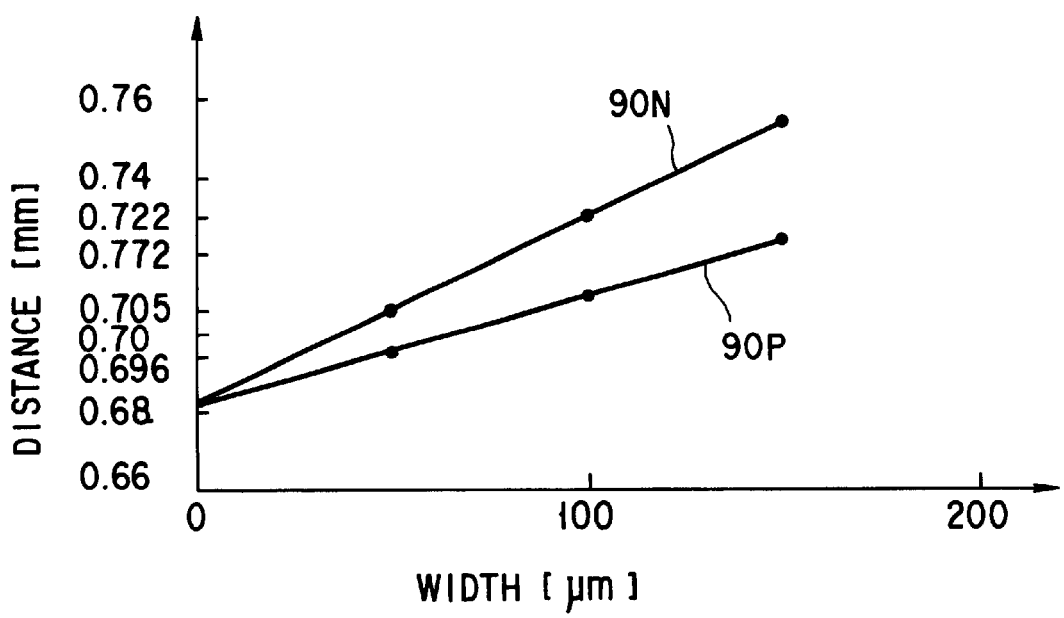
FIG. 9 is a view useful in explaining a method for adjusting the position-of-application of a negative pressure on the slider according to the invention.
Figure 10:
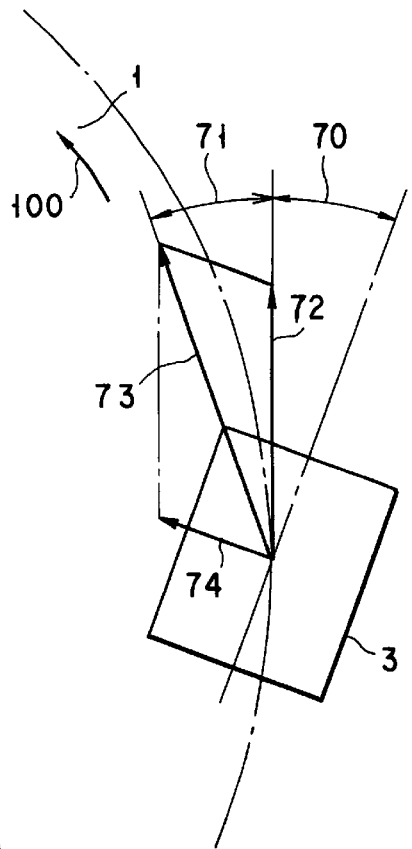
FIG. 10 is a view useful in explaining the relationship between the yaw angle of a slider and the circumferential speed of a disk.

FIG. 9 is a graph illustrating those changes (90N) in the position of application of the negative pressure (Fn), and those changes (90P) in the position of application of the positive pressure (Fp), which occur when the width (SW) of the step portion 46 is adjusted as indicated by the abscissa. The ordinate of FIG. 9 indicates the distance between the position of application of the negative (positive) pressure and the inlet-side (300A) end of the slider 40.

As is shown in FIG. 9, the greater the step width (SW) (0–150), the longer the distance (i.e. the greater the position of application of the negative (positive) pressure shifts to the outlet side of the slider 40. Moreover, as is understood from FIG. 9, the position of application of the negative pressure (Fn) shifts (90N) more than that of the positive pressure. In other words, the position-of-application (Pn) of the negative pressure (Fn) can be set in a desired position by adjusting the width (SW) of the step section 46.

(Operation of Slider)

Suppose that the slider 40 is shifted from above the rotating disk 1 toward the ramp member 10 to be unloaded. Before unloading, the flying state of the slider 40 is determined by the positive pressure (Fp) that is the sum of the positive pressure from the inlet-side (300A) PPG section 43 and the positive pressure from the outlet-side PPG section, and the negative pressure (Fn) occurring at the NPG section 44 side, as is shown in FIG. 1A. At this time, the positions-of-application (Ps, Pp, Pn), on the slider 40, of the suspension load (Fs), the positive pressure (Fp) and the negative pressure (Fn) are situated in this order from the inlet side (300A) to the outlet side (300B), as is shown in FIG. 1B.

The position-of-application (Pp) of the positive pressure (Fp) is set by the structure of the PPG section 43 and the PPG section that are located downstream with respect to the direction-of-rotation 100 of the disk 1. On the other hand, the position-of-application (Pn) of the negative pressure (Fn) is set by the width (SW) of the step section 46 and the structure of the NPAB section 44 interposed between the side portions 42. Accordingly, as described above, the position-of-application (Pn) of the negative pressure (Fn) can be set simply by setting the width (SW) of the step section 46 without much changing the position-of-application (Pp) of the positive pressure (Fp). Specifically, if the width (SW) of the step section 46 is set large, the position-of-application (Pn) shifts to the outlet side (300B), whereas if it is set small, the position shifts to the inlet side (300A) (see FIG. 9).

Figure 14A:
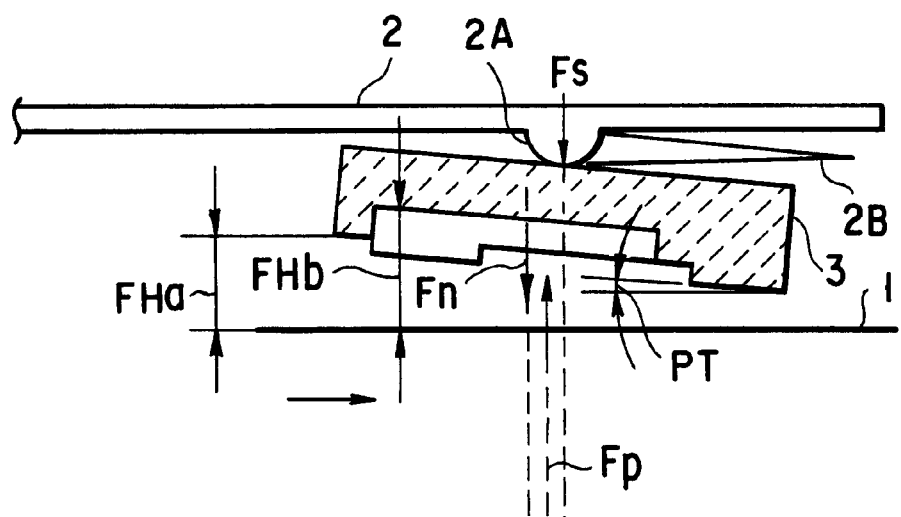
FIGS. 14A and 14B are views showing the structure of a conventional NPAB slider.
Figure 14B:
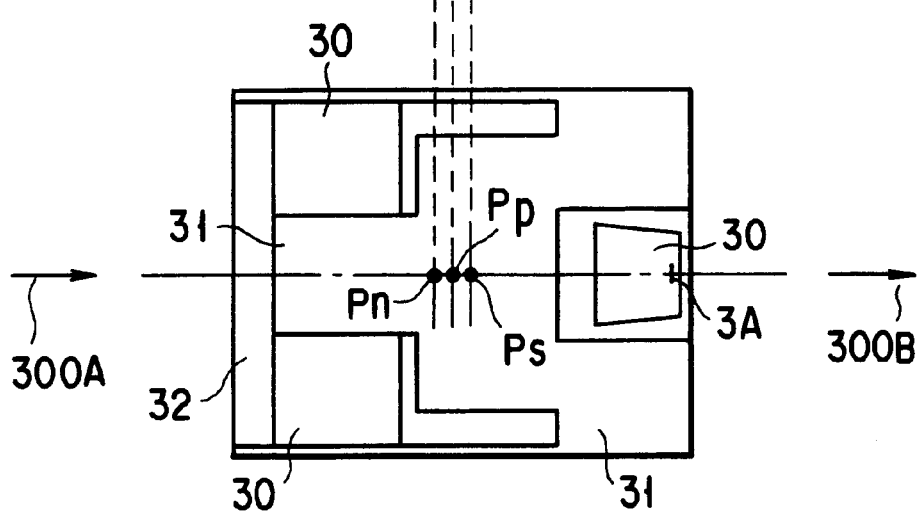

As described above, the positions-of-application (Ps, Pp, Pn), on the slider 40, of the suspension load (Fs), the positive pressure (Fp) and the negative pressure (Fn) can be situated in this order from the inlet side (300A) to the outlet side (300B), as is shown in FIG. 1B. Accordingly, at the time of unloading, the degree of pitching of the slider 40 promptly increases (i.e. increase of "PT" in FIG. 14A) in accordance with a reduction in suspension load (Fs) acting upon the most inlet side (300A) of the slider 40. As a result, the amount of air flowing from the inlet side (300A) into a space between the slider 40 and the disk 1 increases, and the negative pressure (Fn) at the NPG section 44 of the slider 40 promptly reduces.

In summary, when unloading the slider 40 of the invention, the negative pressure (Fn) at the NPG section 44 reduces promptly, and therefore the slider 40 can be promptly separated from the disk surface. This means that the occurrence of suction of the slider 40 to the disk surface due to the negative pressure (Fn) can be suppressed at the time of unloading. In other words, the slider 40 can be shifted from the loading state to the unloading state, with its flying height kept sufficiently. This being so, the ramp member for raising the slider up to a high level is not necessary, which enables realization of a thinner construction of the HDD. On the other hand, the after loading, a normal suspension load (Fs) is exerted, and the slider generates a sufficiently large negative pressure (Fn). Accordingly, the slider 40 can be in a stable flying state.

(Modification of Slider According to the Embodiment)

Referring then to FIGS. 3A, 4, 5 and 6A–6D, modifications of the slider of the embodiment will be described.

Figure 3B:
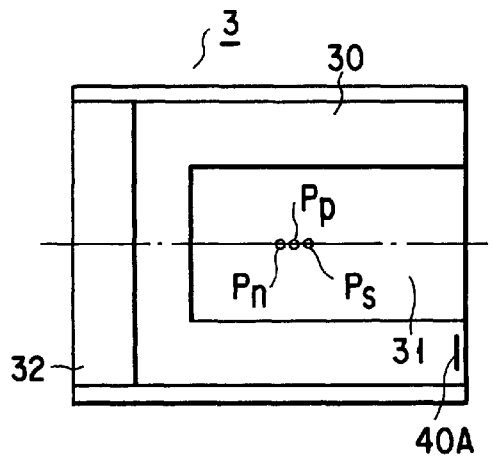
FIG. 3B is a view illustrating a conventional NPAB slider.

FIGS. 3A and 3B are views useful in comparing the slider 40 of the embodiment and the conventional slider 3. FIG. 4 shows a modification of the slider 40. This modification differs from the slider of FIG. 3A in that in the former, outlet-side portions of the opposite side portions 42 (land portions) are shaped into long lands of a horse shoe shape extending in the direction of air flow. FIG. 5 shows a slider 50, which differs from the conventional slider 3 shown in FIG. 3B in that in the former, an inlet-side edge portion 54A of an NPAB section 54 is shifted to the outlet side. This structure also enables the shifting of the position-of-application (Pn) of the negative pressure to the outlet side, as compared with the conventional case. Although in this case, the position-of-application (Pp) of the positive pressure is also slightly shifted to the outlet side, it is estimated that the amount of shifting of the substantial position-of-application (Pn) is greater than that of the position-of-application (Pp) in light of the fact that the positive pressure is generated both at the inlet side and near the outlet side. In short, the position-of-application (Pn) of the negative pressure can be shifted to the outlet side by appropriately adjusting the amount of shifting of the inlet-side edge portion 54A of the NPG section 54.

FIG. 6A shows a slider 40 of a structure in which the shallow step portion 46 located between the PPAB section 43 and the NPG section 44 is partially removed. FIG. 6B shows a slider 40 of a structure in which the contact surface 43B of the PPAB section 43 is divided into two portions 43B1 and 43B2. FIG. 6C shows a slider 40 of a structure in which a land surface 60 is provided at a middle portion of the outlet-side end, in addition to the land surfaces 41, and the read/write element 40A is located in the land surface 60.

FIG. 6D shows a slider 40 of a structure in which the NPAB section 44 is formed such that its width increases to reduce the width of the side portions 42 from the inlet side to the outlet side (300B). Since in this structure, the cross section of the air flow passage increases to the outlet side in the NPAB section 44, the air flowing from the inlet side gradually expands, thereby permitting a relatively high negative pressure to be maintained at the outlet side. Accordingly, the position-of-application (Pn) of the negative pressure (Fn) can be shifted to a portion closer to the outlet-side end of the slider.

As described above in detail, the invention can provide an NPAB slider for use in the ramp loading type head disk assembly, which can create an appropriate negative pressure for a load/unload operation. In other words, a sufficient negative pressure is generated at the time of read/write operation after loading, thereby permitting the slider to fly in a stable state with a low flying height. On the other hand, the negative pressure can be minimized at the time of unloading, thereby permitting the slider to fly in a stable state with a sufficient flying height, and hence preventing the slider from contacting the disk. Thus, in the case of a disk drive having a ramp loading type head disk assembly using the NPAB slider of the invention, the height of the ramp member necessary for unloading can be minimized and hence the drive can be thinned.

(Modification of Head Disk Assembly)

Figure 11:
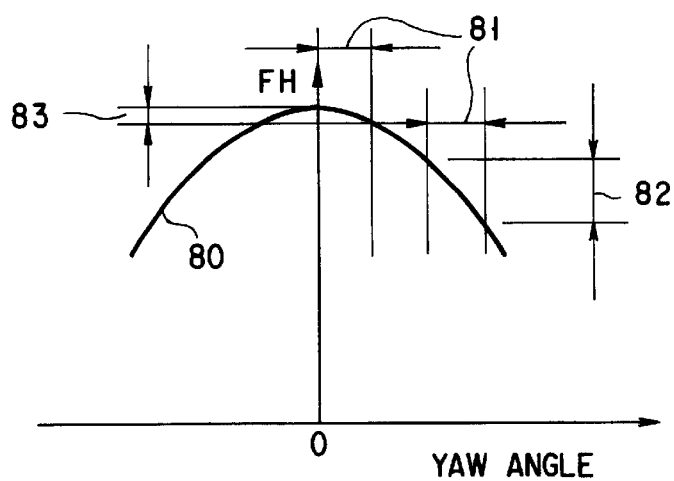
FIG. 11 is a view useful in explaining the relationship between the yaw angle of the slider and the flying height of it.

To secure a sufficient flying height for the head slider when unloading it, it is desirable to construct such that the yaw angle of the slider with respect to the direction of rotation of the disk 1 is set smaller at the outer edge side of the disk than at the inner edge side. Specifically, as shown in FIG. 11, the larger the yaw angle of the slider, the lower its flying height. However, with respect to a yaw angle change 81 which occurs during unloading, the degree of reduction of the flying height differs between the degree-of-reduction 83 of the flying height occurring when the original yaw angle is small, and the degree-of-reduction 82 occurring when it is large. In light of this, to minimize the reduction of the flying height during unloading, it is effective to set small the yaw angle assumed at the outer edge of the disk 1, thereby reducing the degree of reduction of the flying height due to an equivalent yaw angle.

On the other hand, in the case of using a rotary head actuator 4, it is difficult to set the yaw angle small in all areas ranging from the inner edge to the outer edge. Therefore, in the aforementioned structure in which the yaw angle is set small at the outer edge side, it is possible that the yaw angle is relatively large at the inner edge side. Since the circumferential speed of the disk is relatively low at the inner edge side, the flying height of the slider tends to become lower. One way that seems to suppress such a tendency is to set the negative pressure higher at the outer edge side than at the inner edge side, so as to offset the effect of the circumferential speed and the yaw angle. More specifically, it is desirable to set such that the greater the circumferential speed of the disk, the greater the negative pressure of the slider. This can be realized by appropriately adjusting the deep step section 31 at which the negative pressure is generated.

As another way, the structure in which the yaw angle is made small at the outer edge side of the disk may be combined with the slider structure of the aforementioned embodiment. The slider 40 shown in FIGS. 1A and 1B has four land surfaces 41, 43A and 43B for mainly generating the positive pressure. Accordingly, in the slider of the invention, the length of each land surface along the circumference of the disk is set at not more than twice the length perpendicular thereto. By virtue of this structure, the reduction of the flying height can be minimized even when the yaw angle increases. The conventional slider has a long land surface extending in a circumferential direction of the disk, and its flying height becomes lower as the yaw angle increases. On the other hand, even when in the slider of the present invention, a large yaw angle occurs at the inner edge side of the disk, the flying height can be set substantially constant, and also the yaw angle can be made small at the outer edge side. Accordingly, a reduction in flying height due to the yaw angle change can be minimized.

FIGS. 15A and 15B show a modification of the ramp loading type head disk assembly (HDD) having an NPAB slider according to the invention.

As is shown in FIG. 15A, in this modification, a ramp member 10 as a structural element of the ramp loading type head disk assembly is completely separated from the outer edge of the disk 1. When unloading the slider, the head actuator 4 moves toward the outer edge of the disk 1, whereby a loading tab 11 runs onto the ramp member 10. Thus, the slider 40 is set in a standby state at a location completely separate from the disk surface.

Further, as is shown in FIG. 15B, the modification is constructed such that the head actuator 4 is not positioned above the disk 1 when the slider 40 is unloaded. Specifically, the suspension 2 is attached so that its center line 150A and the center line 150B of the actuator 4 will form a predetermined angle θ (inline angle). This angle θ is about 2–10°.

As described above, when used in the ramp loading type head disk assembly, the NPAB slider 40 of the invention can be prevented from contacting the disk 1 at the time of unloading, and also can be set in a standby state in a position completely separate from the disk 1. Accordingly, even if a shock, for example, is applied to the disk drive from the outside, the slider 40 can be prevented from being put into contact with the disk 1.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A head slider, for use in a disk drive, supported by a suspension incorporated in a head actuator, the suspension is a component part of a dynamic head loading and unloading type head disk assembly that has a ramp member located at an outer edge side of the disk, the head slider comprising:

a read/write element for reading and writing data from and onto a disk; and a negative pressure air bearing type slider body in which while the slider body is held by the suspension and flies above the disk as a result of inflow of air due to rotation of the disk, a position-of-application of a negative pressure is closer to an air outlet than a pivot position as a position-of-application of load of the suspension.

2. A head slider according to claim 1, wherein the slider body includes:

positive pressure sections located at an air inlet side and an air outlet side for receiving air flowing therein and generating a positive pressure during rotation of the disk while the slider is held by the suspension;

a negative pressure section located at an air outlet side and consisting of a step section deeper than the positive pressure section, the negative pressure section generating the negative pressure; and a setting element consisting of a step section shallower than the negative pressure section and located between the positive pressure section of the air inlet side and the negative pressure section, the setting element setting the position-of-application of the negative pressure.

3. A head slider according to claim 2, wherein the negative pressure section consists of lands coupled by a shallow step for generating the negative pressure at an air outlet side.

4. A head slider according to claim 2, wherein the positive pressure section consists of inlet-side and outlet-side lands, and at least the outlet-side lands have a length, along the circumference of the disk, not more than twice a length of the shallow step section perpendicular thereto.

5. A disk drive comprising:

a disk for recording data;

a dynamic head loading and unloading type head actuator mechanism having a suspension that supports a head element for reading and writing data from and onto the disk; and a negative pressure air bearing type head slider provided with the head element, supported by the suspension, and having an element that uses inflow and outflow of air due to rotation of the disk to generate a positive pressure and a negative pressure, a position-of-application of the negative pressure being closer to an air outlet than a position-of-application of load of the suspension.

6. A disk drive according to claim 5, wherein the head actuator mechanism is constructed such that the negative pressure air bearing type head slider has a yaw angle with respect to a direction of rotation of the disk is smaller at an outer edge side of the disk than at an inner edge side of the disk.

7. A disk drive according to claim 5, wherein the negative pressure air bearing type head slider includes:

positive pressure sections located at an air inlet side and an air outlet side for receiving air flowing therein and generating a positive pressure during rotation of the disk while the slider is held by the suspension;

a negative pressure section located at an air outlet side and consisting of a step section deeper than the positive pressure section, the negative pressure section generating the negative pressure; and a setting element consisting of a step section shallower than the negative pressure section and located between the positive pressure section and the negative pressure section, the setting element setting the position-of-application of the negative pressure.

8. A disk drive comprising:

a disk for recording data;

a dynamic head loading and unloading type head actuator mechanism having a suspension that supports a head element for reading and writing data from and onto the disk; and a negative pressure air bearing type head slider provided with the head element, supported by the suspension, and having an element that uses inflow and outflow of air due to rotation of the disk to generate a positive pressure and a negative pressure, wherein the head actuator mechanism is constructed such that the negative pressure air bearing type head slider has a yaw angle with respect to a direction of rotation of the disk is smaller at an outer edge side of the disk than at an inner edge side of the disk.

* * * * *